(12) United States Patent
Beasley et al.

(10) Patent No.: US 9,127,543 B2
(45) Date of Patent: *Sep. 8, 2015

(54) ACTIVE SEISMIC MONITORING OF FRACTURING OPERATIONS

(75) Inventors: Craig J. Beasley, Houston, TX (US); Olivier Peyret, Houston, TX (US)

(73) Assignee: WesternGeco L.L.C., Houston, TX (US)

( * ) Notice: Subject to any disclaimer, the term of this patent is extended or adjusted under 35 U.S.C. 154(b) by 240 days.

This patent is subject to a terminal disclaimer.

(21) Appl. No.: 13/540,460

(22) Filed: Jul. 2, 2012

(65) Prior Publication Data

US 2013/0000893 A1  Jan. 3, 2013

Related U.S. Application Data

(63) Continuation-in-part of application No. 13/112,780, filed on May 20, 2011, now Pat. No. 8,210,262, which is a continuation of application No. 12/256,285, filed on Oct. 22, 2008, now Pat. No. 7,967,069.

(51) Int. Cl.

| | |
|---|---|
| *E21B 43/26* | (2006.01) |
| *G01V 1/44* | (2006.01) |
| *G01V 1/42* | (2006.01) |
| *G01V 1/50* | (2006.01) |
| *E21B 47/10* | (2012.01) |
| *G01V 1/00* | (2006.01) |

(52) U.S. Cl.
CPC .............. *E21B 43/26* (2013.01); *E21B 47/101* (2013.01); *G01V 1/003* (2013.01); *G01V 1/42* (2013.01); *G01V 1/44* (2013.01); *G01V 1/50* (2013.01); *G01V 2210/612* (2013.01)

(58) Field of Classification Search
USPC ................................ 166/308.1, 250.1, 254.1
See application file for complete search history.

(56) References Cited

U.S. PATENT DOCUMENTS

| | | | |
|---|---|---|---|
| 4,280,200 A | | 7/1981 | Silverman |
| 5,010,527 A | * | 4/1991 | Mahrer ........................... 367/86 |
| 5,128,866 A | | 7/1992 | Weakley |
| 5,574,218 A | * | 11/1996 | Withers ..................... 73/152.02 |
| 5,899,272 A | | 5/1999 | Loree |
| 5,924,049 A | | 7/1999 | Beasley et al. |
| 6,112,817 A | | 9/2000 | Voll et al. |
| 6,206,108 B1 | | 3/2001 | MacDonald et al. |

(Continued)

OTHER PUBLICATIONS

Audigane, et al., "Permeabilty Characterization of the Soultz and Ogachi Large-Scale Reservoir using Induced Microseismicity", Geophysics, vol. 67, 2002, pp. 204-211.

(Continued)

*Primary Examiner* — Giovanna C Wright
(74) *Attorney, Agent, or Firm* — Abimbola Bukoye (57) ABSTRACT

A method for managing a fracturing operation. In one implementation, the method may include positioning a seismic source and at least one seismic receiver near a hydrocarbon reservoir; pumping a fracturing fluid into a well bore of the hydrocarbon reservoir such that the fracturing fluid may include an additive that enhances acoustic impedance between the fracturing fluid and subsurface formations in which the hydrocarbon reservoir is located and that produces a foam; performing a seismic survey with the seismic source and the at least one seismic receiver during the fracturing operation; and identifying locations of the fracturing fluid within subsurface formations in which the hydrocarbon reservoir is located.

16 Claims, 3 Drawing Sheets

(56) References Cited

U.S. PATENT DOCUMENTS

| | | | |
|---|---|---|---|
| 6,263,283 | B1 | 7/2001 | Snider et al. |
| 6,412,561 | B1 | 7/2002 | Brown et al. |
| 6,473,696 | B1 | 10/2002 | Onyia et al. |
| 7,003,439 | B2 | 2/2006 | Aldred et al. |
| 7,063,174 | B2 | 6/2006 | Chemali et al. |
| 7,127,353 | B2 | 10/2006 | Geiser |
| 7,134,492 | B2 | 11/2006 | Willberg et al. |
| 7,255,173 | B2 | 8/2007 | Hosie et al. |
| 7,274,304 | B2 | 9/2007 | Hall et al. |
| 7,280,918 | B2 | 10/2007 | Williams |
| 7,389,185 | B2 | 6/2008 | Craig |
| 7,916,576 | B2 | 3/2011 | Beasley et al. |
| 7,967,069 | B2 | 6/2011 | Beasley |
| 8,210,262 | B2 | 7/2012 | Beasley |
| 2004/0035634 | A1 | 2/2004 | Rueter |
| 2004/0129424 | A1 | 7/2004 | Hosie et al. |
| 2005/0235745 | A1 | 10/2005 | Proett et al. |
| 2006/0023567 | A1 | 2/2006 | Uhl et al. |
| 2006/0047431 | A1 | 3/2006 | Geiser |
| 2006/0062084 | A1 | 3/2006 | Drew |
| 2006/0081412 | A1 | 4/2006 | Wright et al. |
| 2006/0247861 | A1 | 11/2006 | McCoy et al. |
| 2007/0083331 | A1 | 4/2007 | Craig |
| 2007/0204995 | A1 | 9/2007 | Hofman et al. |
| 2008/0149329 | A1 | 6/2008 | Cooper et al. |
| 2008/0316860 | A1 | 12/2008 | Muyzert et al. |
| 2009/0168600 | A1 | 7/2009 | Moore et al. |
| 2009/0242205 | A1 | 10/2009 | Coste et al. |
| 2009/0248309 | A1 | 10/2009 | Neville et al. |
| 2010/0032156 | A1 | 2/2010 | Petty et al. |
| 2010/0042325 | A1 | 2/2010 | Beasley et al. |
| 2010/0096125 | A1 | 4/2010 | Beasley |
| 2011/0199862 | A1 | 8/2011 | Pop |
| 2011/0214869 | A1 | 9/2011 | Beasley |
| 2011/0272147 | A1 | 11/2011 | Beasley et al. |
| 2013/0000893 | A1 | 1/2013 | Beasley et al. |

OTHER PUBLICATIONS

Biot, M.A., "Theory of Propagation of Elastic Waves in a Fluid-Saturated Porous Solid: II. Higher Frequency Range", The Journal of the Acoustical Society of America, vol. 28 (2), 1956, pp. 179-191.
Cooper, et al., "Foinaven Active Reservoir Management: The time-lapse signal", SEG Expanded Abstracts, 1999, pp. 1-4.
Cornet, Francois H., "Comment on Large-scale in situ permeability tensor of rocks from induced microseismicity", Geophys. J. Int., vol. 140, 2000, pp. 465-469.
Dragoset, et al., "The impact of field-survey characteristics on surface-related multiple attenuation, Section II—Rhodes Workshop", Geophysical Prospecting, vol. 54, 2006, pp. 781-791.
Karpfinger, et al., "Diffusivity Estimations Based on Seismicity Triggered by Fluid Injections in Boreholes", EAGE 66th Conference & Exhibition, Jun. 2004, pp. 1-4.
Rothert, et al., "Microseismic monitoring of borehole fluid injections: Data modeling and inversion for hydraulic properties of rocks", Short Note, Geophysics, vol. 68(2), 2003, pp. 685-689.
Rothert, Elmar, "Fluid induced microseismicity: Data modeling and inversion for hydraulic properties of rocks", Objekt-Metadaten, http://www.diss.fu-berlin.de/diss/receive/FUDISS_thesis_000000001210, 2004, pp. 1-3.
Shapiro, Serge A., "An inversion for fluid transport properties of three-dimensionally heterogeneous rocks using induced microseismicity", Geophys. J. Int., vol. 143, 2000, pp. 931-936.
Shapiro, et al., "Characterization of fluid transport properties of reservoirs using induced microseismicity", Goephysics, vol. 67 (1), 2002, pp. 212-220.
Shapiro, et al., "Estimating the crust permeability from fluid-injection-induced seismic emission at the KTB site", Fast-Track Paper, Geophys. J. Int., vol. 131, 1997, pp. F15-F18.
Shapiro, et al., "Estimating the permeability from fluid-injection induced seismic emission", Poromechancs, Rotterdam: Thimus, et al. (eds), 1998, pp. 301-305.
Shapiro, et al., "Large-scale in situ permeability tensor of rocks frominduced microseismicity", Geophys. J. Int., vol. 137, 1999, pp. 207-213.
Shapiro, et al., "Reply to comment by F.H. Cornet on Large-scale in situ permeability tensor of rocks from induced microseismicity", Geophys. J. Int., vol. 140, 2000, pp. 470-473.
Shapiro, et al., "Triggering of Seismicity by Pore-pressure Perturbations: Permeability-related Signatures of the Phenomenon", Pure appl. Geophys. vol. 160, 2003, pp. 1051-1066.
Wills, et al., "Active and Passive Imaging of Hydraulic Fractures", Geophysics: The Leading Edge of Exploration, vol. 7 (11), Jul. 1992, pp. 15-22.
Wynn, D., "Geophysical Monitoring of Geologic Sequestration in Aquifers and Depleted Oil and Gas Fields", MS Project Report, Department of Geophysics, Stanford University, 2003, pp. 1-43.
International Search Report and Written Opinion issued in PCT/US2009/052706 on Mar. 16, 2010.
International Preliminary Report on Patentability issued in PCT/US2009/052706 on Feb. 22, 2011.
Pascal, et al., "Permeability Characterization of the Soultz and Ogachi large-scale reservoir using induced microseismicity", Geophysics, vol. 67, No. 1, 2002, pp. 204-211.
Biot, "Theory of propagation of elastic waves in a fluid-saturated porous solid—I. Low-frequency range", Journal of the Acoustical Society of America, vol. 28, No. 2, Mar. 1956, pp. 168-178.

* cited by examiner

ACTIVE SEISMIC MONITORING OF FRACTURING OPERATIONS

CROSS-REFERENCE TO RELATED APPLICATIONS

This application is a continuation-in-part of co-pending of U.S. patent application Ser. No. 13/112,780 filed May 20, 2011, which is a continuation of U.S. patent application Ser. No. 12/256,285 filed Oct. 22, 2008; both of which are incorporated herein by reference in their entireties.

BACKGROUND

1. Field of the Invention

Implementations of various technologies described herein generally relate to methods and systems for hydraulic fracturing operations.

2. Description of the Related Art

The following descriptions and examples are not admitted to be prior art by virtue of their inclusion within this section.

In the recovery of hydrocarbons from subterranean formations it is common practice, particularly in formations of low permeability, to fracture the hydrocarbon-bearing formation to provide flow channels. These flow channels facilitate movement of the hydrocarbons to the well bore so that the hydrocarbons may be pumped from the well.

In such fracturing operations, a fracturing fluid is hydraulically injected into a well bore penetrating the subterranean formation and is forced against the formation strata by pressure. The formation strata or rock is forced to crack and fracture, and a proppant is placed in the fracture by movement of a viscous-fluid containing proppant into the crack in the rock. The resulting fracture, with proppant in place, provides improved flow of the recoverable fluid, i.e., oil, gas or water, into the well bore.

Fracturing fluids customarily comprise a thickened or gelled aqueous solution which has suspended therein "proppant" particles that are substantially insoluble in the fluids of the formation. Proppant particles carried by the fracturing fluid remain in the fracture created, thus propping open the fracture when the fracturing pressure is released and the well is put into production. Suitable proppant materials include sand, walnut shells, sintered bauxite or similar materials. The "propped" fracture provides a larger flow channel to the well bore through which an increased quantity of hydrocarbons can flow, thereby increasing the production rate of a well.

A problem common to many hydraulic fracturing operations is the loss of fracturing fluid into the porous matrix of the formation. Fracturing fluid loss is a major problem. Hundreds of thousands (or even millions) of gallons of fracturing fluid must be pumped down the well bore to fracture such wells, and pumping such large quantities of fluid is very costly. The lost fluid also causes problems with the fracturing operation. For example, the undesirable loss of fluid into the formation limits the fracture size and geometry which can be created during the hydraulic fracturing pressure pumping operation. Thus, the total volume of the fracture, or crack, is limited by the lost fluid volume that is lost into the rock, because such lost fluid is unavailable to apply volume and pressure to the rock face.

SUMMARY

Described herein are implementations of various technologies for a method for managing a fracturing operation. In one implementation, the method may include positioning a seismic source and at least one seismic receiver near a hydrocarbon reservoir; pumping a fracturing fluid into a well bore of the hydrocarbon reservoir such that the fracturing fluid may contain an additive that enhances acoustic impedance between the fracturing fluid and subsurface formations in which the hydrocarbon reservoir is located and such that the additive produces a foam; performing a seismic survey with the seismic source and the at least one seismic receiver during the fracturing operation; and identifying locations of the fracturing fluid within subsurface formations in which the hydrocarbon reservoir is located.

In another implementation, the method may include positioning a seismic source and at least one seismic receiver below a surface of the Earth near a hydrocarbon reservoir;

pumping a fracturing fluid into a well bore of the hydrocarbon reservoir, such that the fracturing fluid may contain an additive that enhances acoustic impedance between the fracturing fluid and subsurface formations in which the hydrocarbon reservoir is located;

performing a seismic survey with the seismic source and the at least one seismic receiver during the fracturing operation; and identifying locations of the fracturing fluid within the subsurface formations in which the hydrocarbon reservoir is located. The seismic source, the at least one seismic receiver, or both may be disposed inside the well bore. Alternatively, the seismic source, the at least one seismic receiver, or both may be disposed inside a borehole proximate the hydrocarbon reservoir.

In yet another implementation, the method may include positioning at least one seismic source and at least one seismic receiver near a hydrocarbon reservoir; performing a baseline seismic survey; performing the fracturing operation by pumping a fracturing fluid into a well bore of the hydrocarbon reservoir; performing a closing seismic survey at the end of the fracturing operation; analyzing one or more differences between an image generated by the baseline seismic survey and an image generated by the closing seismic survey; and identifying one or more locations of the fracturing fluid within a subsurface formation in which the hydrocarbon reservoir is located.

In yet another implementation, the method may include positioning at least one seismic source and at least one seismic receiver near a hydrocarbon reservoir; performing the fracturing operation by pumping a fracturing fluid into a well bore of the hydrocarbon reservoir; performing a first seismic survey during the fracturing operation; performing a second seismic survey at the end of the fracturing operation; analyzing one or more differences between an image generated by the first seismic survey and an image generated by the second seismic survey; and identifying one or more locations of the fracturing fluid within a subsurface formation in which the hydrocarbon reservoir is located.

The claimed subject matter is not limited to implementations that solve any or all of the noted disadvantages. Further, the summary section is provided to introduce a selection of concepts in a simplified form that are further described below in the detailed description section. The summary section is not intended to identify key features or essential features of the claimed subject matter, nor is it intended to be used to limit the scope of the claimed subject matter.

BRIEF DESCRIPTION OF THE DRAWINGS

Implementations of various techniques will hereafter be described with reference to the accompanying drawings. It should be understood, however, that the accompanying drawings illustrate only the various implementations described herein and are not meant to limit the scope of various technologies described herein.

DETAILED DESCRIPTION

The discussion below is directed to certain specific implementations. It is to be understood that the discussion below is only for the purpose of enabling a person with ordinary skill in the art to make and use any subject matter defined now or later by the patent "claims" found in any issued patent herein.

The following paragraph provides a brief summary of various techniques described herein. In general, various techniques described herein are directed to determining the location of fractures and fracturing fluid in formations surrounding a hydrocarbon reservoir. Rather than passively monitoring for fractures created by the fracturing operation, active seismic monitoring of fracturing operation may be used to provide stronger signaling for fracture detection. Further, pumping fracturing fluid with a high acoustic impedance contrast to the surrounding subsurface formations may increase the visibility of the fracturing fluid on the seismic survey. In one implementation, the fracturing fluid may contain an additive that provides the high acoustic impedance contrast. One or more implementations of various techniques for determining the location of fractures and fracturing fluid in formations surrounding a hydrocarbon reservoir will now be described in more detail with reference to FIGS. 1-3 in the following paragraphs.

Figure 1:
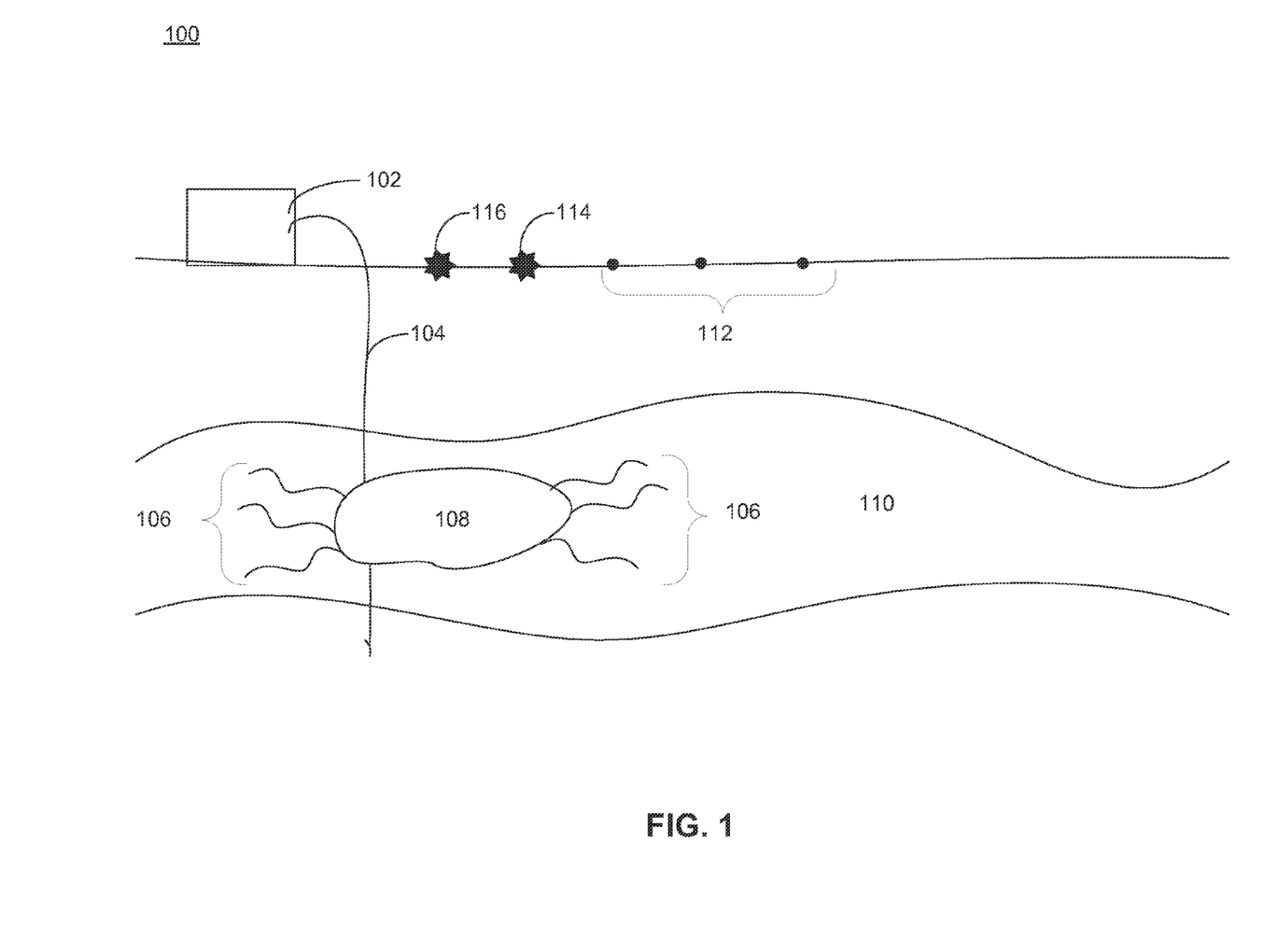
FIG. 1 illustrates a system for monitoring a hydraulic fracturing operation, in accordance with one or more implementations of various techniques described herein.

FIG. 1 illustrates a system 100 for monitoring a hydraulic fracturing operation in accordance with one or more implementations of various techniques described herein. The hydraulic fracturing operation may be also referred to herein as the fracturing operation. In the system 100, the fracturing operation may be conducted in concert with an active seismic survey in order to improve the effectiveness of the fracturing operation. The system 100 may include a pumping mechanism 102, a well bore 104, a hydrocarbon reservoir 108, a seismic array 112 and a seismic source 114.

In performing the fracturing operation, the pumping mechanism 102 may pump a fracturing fluid into the well bore 104 of the hydrocarbon reservoir 108. The hydrocarbon reservoir 108 may be disposed within a subsurface formation 110, such as a sandstone, carbonate, shale, or chalk formation. The pressure resulting from the pumping of fracturing fluid may create fractures 106 in the formation 110. The fractures 106 may improve the flow of hydrocarbons to the well bore 104.

In a typical fracturing operation, the well bore 104 may be perforated such that the fracturing fluid enters the hydrocarbon reservoir 108 at a specified location. The location of the perforations may influence where the fractures 106 are induced in the formation.

The seismic array 112 may be a standard seismic receiver array used in seismic surveying, and may include geophones, receivers, or other seismic sensing equipment. The seismic array 112 may be positioned on the surface or in a borehole. The seismic source 114 may be a standard seismic source used in seismic surveying, such as a vibroseis, or dynamite. Like the seismic array 112, the seismic source 114 may be located on the surface or in a borehole. The seismic source 114 and seismic array 112 may be used to perform a seismic survey during the fracturing operation.

In one implementation, the seismic survey may be used to improve the effectiveness of the fracturing operation. For example, by performing a seismic survey during the fracturing operation, it may be possible to identify where in the formation 110 the fractures 106 are induced.

Sometimes, the fractures 106 that are induced by the fracturing operation may be disposed such that the fractures 106 do not improve the flow of hydrocarbons to the well bore 104. In such a scenario, the perforations in the well bore 104 may be plugged. The well bore 104 may then be re-perforated to change the location within the hydrocarbon reservoir 108 where the fracturing fluid enters. After re-perforating the well bore 104, the fracturing operation may resume.

Figure 2:
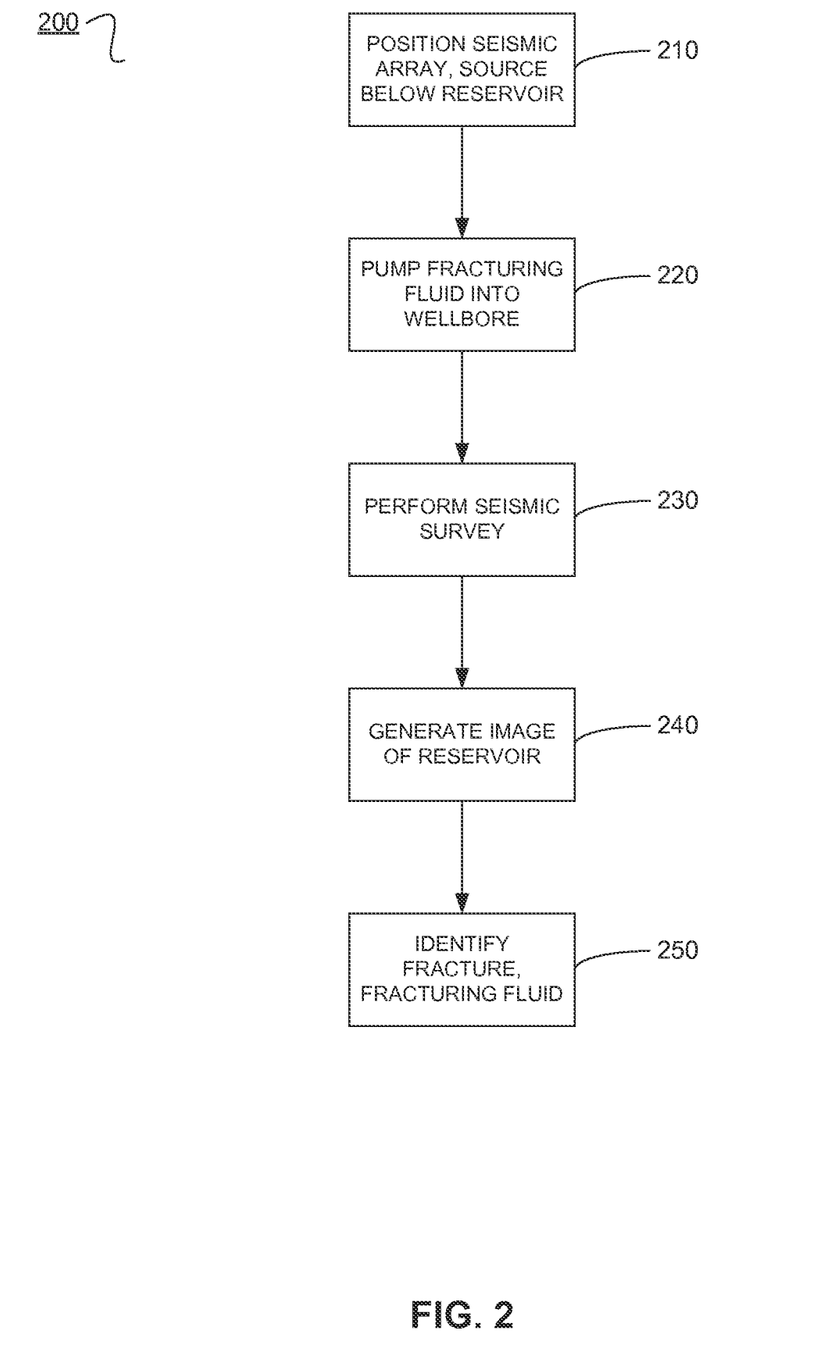
FIG. 2 illustrates a flowchart of a method for managing hydraulic fracturing operations, according to implementations described herein.

FIG. 2 illustrates a flow chart of a method 200 for managing a fracturing operation according to implementations described herein. It should be understood that while method 200 indicates a particular order of execution of the operations, in some implementations, certain portions of the operations might be executed in a different order.

At step 210, the seismic array 112 and the seismic source 114 may be positioned near the hydrocarbon reservoir 108. In one implementation, the seismic array 112 and/or the seismic source 114 may be above the Earth's surface, i.e., above the hydrocarbon reservoir 108. In another implementation, the seismic array 112 and/or the seismic source 114 may be positioned below the Earth's surface, e.g., inside a well bore. Surface or subsurface referenced systems may be positioned to record reflections and refractions from the fracturing fluid and the fractures that contain the fracturing fluid. This positioning can be determined through well known techniques involving seismic modeling methods, such as ray tracing or full wavefield propagation. The seismic source 114 and receivers 112 may include devices for generating and recording pressure waves, shear waves or any combinations thereof and may encompass cabled, wireless, autonomous systems or combinations thereof.

A typical fracturing operation passively listens for acoustic signals that result from the creation of the fractures 106 induced by the fracturing operation. Because these acoustic signals may be weak, a vertical seismic profile (VSP) may be created. The VSP may be used to improve the reliability of the seismic data collected.

To create a VSP, a secondary well bore may be dug as an observational well. Seismic receivers may then be positioned in the observational well, or may be positioned in the observational well in addition to the surface receivers in the seismic array 112. The acoustic signals recorded by the receivers in the observational well may then be correlated with the signals recorded at the surface.

Using method 200, it may not be necessary to dig an observational well because the seismic source 114 is used to actively survey for fractures during the fracturing operation. The seismic source 114 may provide a stronger signal than the signals generated in creating the fractures, such as acoustic signals generated by the breaking of rocks. The seismic source 114 and/or the seismic array 112 may be positioned in the observational well.

At step 220, the pumping mechanism 102 may pump fracturing fluid into the well bore of the hydrocarbon reservoir 108. As stated previously, pumping the fracturing fluid into the well bore 104 may induce fracturing of the formation 110 of the hydrocarbon reservoir 108.

At step 230, the seismic source 114 and the seismic array 112 may be used to perform the seismic survey. The pumping mechanism 102 may produce acoustic signals that introduce noise into the seismic survey. As such, the fracturing operation may be coordinated with the seismic survey such that the pumping mechanism 102 is halted while the seismic survey is being performed.

In one implementation, the acoustic signals produced by the pumping mechanism 102 may be used as an additional seismic source for the seismic survey. In another implementation, the pumping mechanism 102 may be used as the seismic source 114.

In another implementation, a baseline seismic survey may be performed before the fracturing operation. The baseline seismic survey may then be compared to the seismic survey performed during the fracturing operation to determine changes in amplitude, structural deformation and changes in rock properties, such as formation pressure, and to relate these changes to fracture fluid movement and fracture locations.

In a further implementation, a closing seismic survey may be performed after the fracturing operation has concluded. The closing survey may then be compared to the seismic survey performed during the fracturing operation, and/or to the baseline seismic survey, to determine changes in amplitude, structural deformation and changes in rock properties, such as formation pressure, and to relate these changes to fracture fluid movement and fracture locations.

In another implementation, in addition to the seismic source 114, and as illustrated in FIG. 1, a second seismic source 116 may be used to perform the seismic survey, the baseline seismic survey, the closing seismic survey or combinations thereof. The second seismic source 116 may be a standard seismic source used in seismic surveying, such as a vibroseis or dynamite, and it may be located on the surface or in a borehole. Similar to seismic source 114, the second seismic source 116 may be positioned near the hydrocarbon reservoir 108. For example, the second seismic source 116 may be above the Earth's surface, i.e., above the hydrocarbon reservoir 108, or it may be positioned below the Earth's surface, e.g., inside a well bore.

The energy that is sensed by the seismic array 112 due to a given firing, or "shot," of a seismic source typically is recorded from a time interval that spans from the time at which the shot occurred and ends slightly before the time at which the next shot occurs. Techniques, such as the one disclosed in U.S. Pat. No. 5,924,049, entitled "METHODS FOR ACQUIRING AND PROCESSING SEISMIC DATA," which issued on Jul. 13, 1999 and is hereby incorporated by reference in its entirety, allow multiple seismic sources to fire simultaneously and essentially allow more than one record to be recorded at the same time.

As further described in U.S. Pat. No. 7,916,576, entitled "OPTIMIZING A SEISMIC SURVEY FOR SOURCE SEPARATION," which issued on Mar. 29, 2011 and is hereby incorporated by reference in its entirety, the seismic source 114 and the second seismic source 116 may be fired in a sequence such that the two seismic sources may be fired simultaneously or near simultaneously in a short interval of time so that a composite energy signal that is sensed by the seismic array 112 contains a significant amount of energy from more than one seismic source. In other words, the seismic source 114 and the second seismic source 116 interfere with each other such that the composite energy signal is not easily separable into signals that are attributed to the specific seismic sources.

However, source separation techniques may be applied to process the acquired seismic data to form datasets that are each associated with one of the seismic sources so that each dataset ideally indicates the component of the composite seismic energy signal that is attributable to an associated seismic source. In performing the source separation, though, some of the sensed energy (called the "residual energy") may not ultimately be attributed to any of the seismic sources, and some of the sensed energy (called the "leakage energy") may be attributed to the wrong seismic source by the separation process.

The seismic survey has a number of characterizing parameters which affect the quality of the source separation. More specifically, these parameters may include the timing sequence that governs the seismic source firings, the source geometry (crossline and inline separations of air guns, for example), and the receiver geometry (the type of spread and the crossline and inline separations of the seismic sensors 58, as examples). Therefore, survey parameters, such as firing times, source geometry, receiver geometry (i.e., the geometry of the seismic sensors), etc., may be randomly or pseudo randomly varied within predefined ranges for purposes of determining the optimal survey parameters for source separation.

In one implementation, optimization of the seismic survey may occur when the seismic survey is characterized by a set of parameters that minimizes the residual and leakage energies or at least produces residual and leakage energies that are below selected thresholds.

In another implementation, survey parameters may be optimized for source energy separation based on a linear system that characterizes the seismic survey. For example, a technique to optimize survey parameters may include modeling seismic datasets as being determinable from a linear system that is characterized by a survey geology and survey parameters. Each dataset is associated with the sensed energy uniquely attributable to a different seismic source. The linear system may be inverted for the seismic datasets. The survey parameters are optimized for source separation by maximizing the accuracy of the inversion for the recovery of the datasets.

As a more specific example, source dithering (i.e., using a source firing timing sequence in which the source firing times are slightly offset for each other) may be used for purposes of enabling the separation of interfering seismic sources as described in U.S. patent application Ser. No. 11/964,402, entitled, "SEPARATING SEISMIC SIGNALS PRODUCED BY INTERFERING SEISMIC SOURCES," which was filed on Dec. 26, 2007, and is hereby incorporated by reference in its entirety. Linear operator transforms may be used in a model of the survey system for purposes of decomposing the sensed composite energy signal into signals that are each uniquely associated with a particular seismic source. The invertability of a matrix of this system is maximized for purposes of determining an optimum survey design from the standpoint of source separation.

The source separation techniques described herein may be applied to the seismic survey, the baseline seismic survey, the closing seismic survey or combinations thereof. In other implementations, the source separation techniques described herein may be applied to more than two seismic sources fired simultaneously or near simultaneously in a short interval of time.

At step 240, an image of the hydrocarbon reservoir 108 may be generated. The receivers of the seismic array 112 may record acoustic signals from the seismic source 114 during the seismic survey. Using the recorded acoustic signals, a computing system (not shown) may generate an image of the hydrocarbon reservoir 108. In the implementation where the baseline seismic survey is performed, an image may also be generated from the acoustic signals recorded during the baseline seismic survey. In the implementation where the closing seismic survey is performed, an image may also be generated from the acoustic signals recorded during the closing seismic survey.

At step 250, the fractures 106 and/or the fracturing fluid may be identified on the generated image. In the implementation that includes the baseline seismic survey, the fractures 106 and the fracturing fluid may be identified by analyzing differences between the image generated by the baseline seismic survey and the image generated by the seismic survey performed during the fracturing operation. In the implementation that includes the closing seismic survey, the fractures 106 and the fracturing fluid may be identified by analyzing differences between the image generated by the closing seismic survey and the image generated by the seismic survey performed during the fracturing operation. In another implementation, the fractures 106 and the fracturing fluid may be identified by analyzing differences between the image generated by the closing seismic survey and the image generated by the baseline seismic survey.

In some implementations, the fracturing operation may be modified. The modification to the fracturing operation may be based on the identified fracturing fluid or the differences between the baseline image and the image obtained during the fracturing operation. For example, if the identified fracturing fluid is disposed within the formation 110 such that fractures are not being produced, the fracturing operation may be modified to direct the fracturing fluid towards another location in the formation 110.

In one implementation, the fracturing fluid may contain an additive that enhances the acoustic impedance contrast between the fracturing fluid and the formation 110 of the hydrocarbon reservoir 108. Depending on the signal to noise ratio achieved in the seismic survey, even small changes on the order of several percent can be detected. Giving the fracturing fluid a larger acoustic impedance contrast with the formation 110 helps to distinguish the fracturing fluid from the formation 110 in the generated image.

For example, a fracturing fluid, such as water, may not have a large acoustic impedance contrast with carbonate and chalk formations. As such, methane may be dissolved in the fracturing fluid, producing a fizz gas or foam. The fizz gas or foam may appear as bright spots in the generated image, thereby distinguishing the fracturing fluid from the formation 110.

Figure 3:
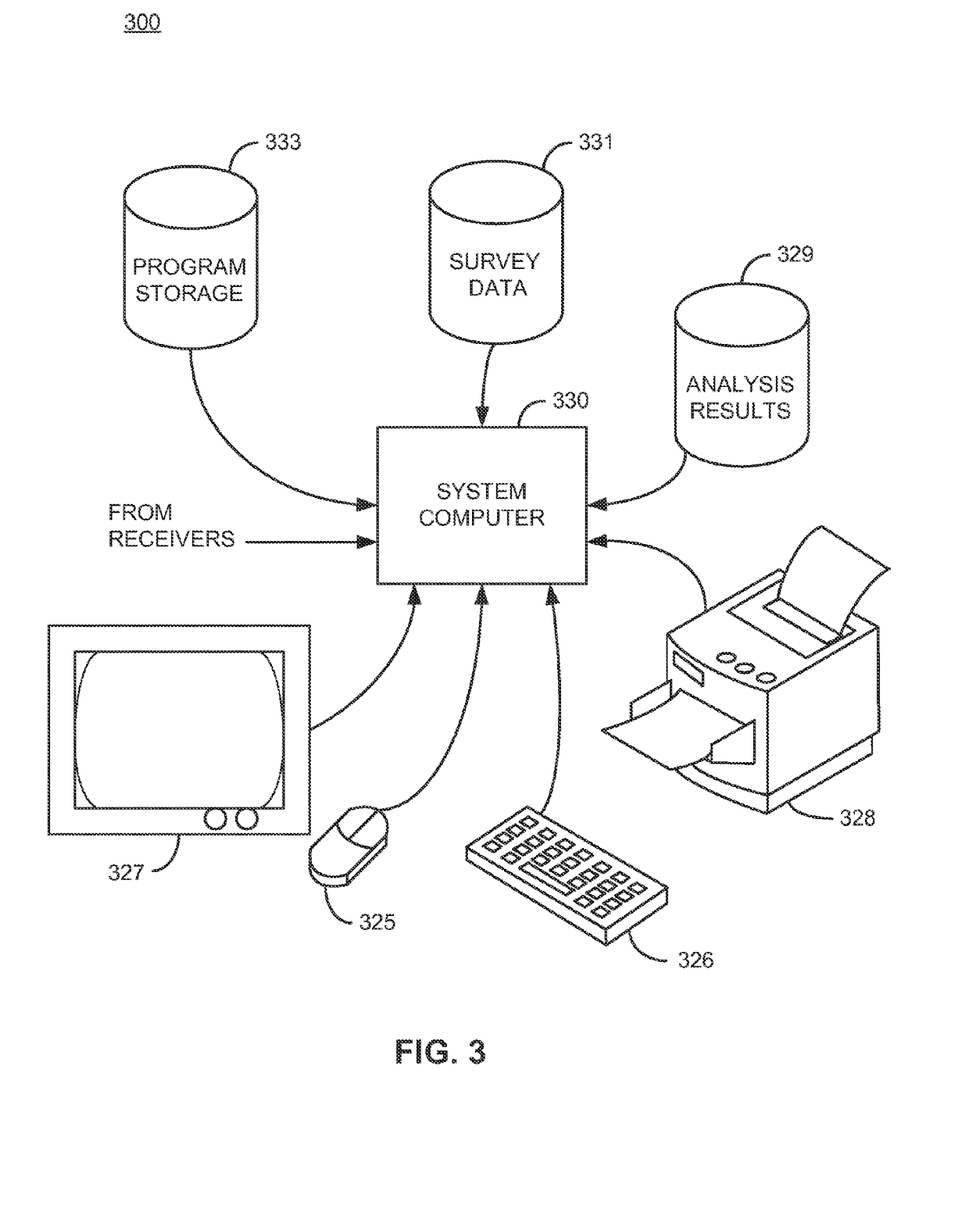
FIG. 3 illustrates a computer network, into which implementations of various technologies described herein may be implemented.

FIG. 3 illustrates a computing system 300, into which implementations of various technologies described herein may be implemented. The computing system 300 may include one or more system computers 330, which may be implemented as any conventional personal computer or server. However, those skilled in the art will appreciate that implementations of various technologies described herein may be practiced in other computer system configurations, including hypertext transfer protocol (HTTP) servers, handheld devices, multiprocessor systems, microprocessor-based or programmable consumer electronics, network PCs, minicomputers, mainframe computers, and the like.

The system computer 330 may be in communication with disk storage devices 329, 331 and 333, which may be external hard disk storage devices. It is contemplated that disk storage devices 329, 331 and 333 are conventional hard disk drives, and as such, will be implemented by way of a local area network or by remote access. Of course, while disk storage devices 329, 331 and 333 are illustrated as separate devices, a single disk storage device may be used to store any and all of the program instructions, measurement data, and results as desired.

In one implementation, seismic data from the receivers may be stored in disk storage device 331. The system computer 330 may retrieve the appropriate data from the disk storage device 331 to process seismic data according to program instructions that correspond to implementations of various technologies described herein. The program instructions may be written in a computer programming language, such as C++, Java and the like. The program instructions may be stored in a computer-readable medium, such as program disk storage device 333. Such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the system computer 330.

Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. Combinations of any of the above may also be included within the scope of computer readable media.

In one implementation, the system computer 330 may present output primarily onto graphics display 327, or alternatively via printer 328. The system computer 330 may store the results of the methods described above on disk storage 329, for later use and further analysis. The keyboard 326 and the pointing device (e.g., a mouse, trackball, or the like) 325 may be provided with the system computer 330 to enable interactive operation.

The system computer 330 may be located at a data center remote from the survey region. The system computer 330 may be in communication with the receivers (either directly or via a recording unit, not shown), to receive signals indicative of the reflected seismic energy. These signals, after conventional formatting and other initial processing, may be stored by the system computer 330 as digital data in the disk storage 331 for subsequent retrieval and processing in the manner described above. While FIG. 3 illustrates the disk storage 331 as directly connected to the system computer 330, it is also contemplated that the disk storage device 331 may be accessible through a local area network or by remote access. Furthermore, while disk storage devices 329, 331 are illustrated as separate devices for storing input seismic data and analysis results, the disk storage devices 329, 331 may be implemented within a single disk drive (either together with or separately from program disk storage device 333), or in any other conventional manner as will be fully understood by one of skill in the art having reference to this specification.

While the foregoing is directed to implementations of various technologies described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for managing a fracturing operation, comprising:
    positioning a first seismic source and at least one seismic receiver near a hydrocarbon reservoir;
    pumping a fracturing fluid into a first well bore of the hydrocarbon reservoir, wherein the fracturing fluid comprises an additive that enhances acoustic impedance contrast between the fracturing fluid and subsurface formations in which the hydrocarbon reservoir is located, wherein the additive produces a foam;
    performing a seismic survey with the first seismic source and the at least one seismic receiver during the fracturing operation; and
    identifying locations of the fracturing fluid within the subsurface formations in which the hydrocarbon reservoir is located.

2. The method of claim 1, wherein the subsurface formations comprise sandstone, carbonate, shale, chalk, or combinations thereof.

3. The method of claim 1, further comprising performing the seismic survey with at least one additional seismic source.

4. The method of claim 3, wherein the first seismic source and the at least one additional seismic source are fired substantially simultaneously.

5. The method of claim 3, further comprising:
    sensing energy, produced by the first seismic source and the at least one additional seismic source, at the at least one seismic receiver; and
    optimizing the seismic survey for separation of the sensed energy according to the first seismic source and the at least one additional seismic source.

6. A method for managing a fracturing operation, comprising:
    positioning a first seismic source and at least one seismic receiver below a surface of the Earth near a hydrocarbon reservoir;
    pumping a fracturing fluid into a well bore of the hydrocarbon reservoir, wherein the fracturing fluid comprises an additive that enhances acoustic impedance contrast between the fracturing fluid and subsurface formations in which the hydrocarbon reservoir is located;
    performing a seismic survey with the first seismic source and the at least one seismic receiver during the fracturing operation; and
    identifying locations of the fracturing fluid within the subsurface formations in which the hydrocarbon reservoir is located.

7. The method of claim 6, wherein the first seismic source, the at least one seismic receiver, or both are disposed inside the well bore.

8. The method of claim 6, further comprising performing the seismic survey with at least one additional seismic source.

9. The method of claim 8, wherein the first seismic source and the at least one additional seismic source are fired substantially simultaneously.

10. The method of claim 8, further comprising:
    sensing energy, produced by the first seismic source and the at least one additional seismic source, at the at least one seismic receiver; and
    optimizing the seismic survey for separation of the sensed energy according to the first seismic source and the at least one additional seismic source.

11. The method of claim 6, wherein the additive produces a foam or a fizz gas.

12. A method for managing a fracturing operation, comprising:
    positioning a first seismic source and at least one seismic receiver near a hydrocarbon reservoir;
    performing a baseline seismic survey with the first seismic source and the at least one seismic receiver;
    performing the fracturing operation by pumping a fracturing fluid into a well bore of the hydrocarbon reservoir, wherein the fracturing fluid comprises an additive that enhances acoustic impedance contrast between the fracturing fluid and the subsurface formation;
    performing a closing seismic survey with the first seismic source and the at least one seismic receiver at the end of the fracturing operation;
    analyzing one or more differences between an image generated by the baseline seismic survey and an image generated by the closing seismic survey; and
    identifying one or more locations of the fracturing fluid within a subsurface formation in which the hydrocarbon reservoir is located.

13. A method for managing a fracturing operation, comprising:
    positioning a first seismic source and at least one seismic receiver near a hydrocarbon reservoir;
    performing a baseline seismic survey with the first seismic source, at least one additional seismic source, and the at least one seismic receiver, wherein the first seismic source and the at least one additional seismic source are fired substantially simultaneously;
    performing the fracturing operation by pumping a fracturing fluid into a well bore of the hydrocarbon reservoir;
    performing a closing seismic survey with the first seismic source and the at least one seismic receiver at the end of the fracturing operation;
    analyzing one or more differences between an image generated by the baseline seismic survey and an image generated by the closing seismic survey; and
    identifying one or more locations of the fracturing fluid within a subsurface formation in which the hydrocarbon reservoir is located.

14. A method for managing a fracturing operation, comprising:
    positioning a first seismic source and at least one seismic receiver near a hydrocarbon reservoir;
    performing a baseline seismic survey with the first seismic source, at least one additional seismic source, and the at least one seismic receiver;
    sensing energy produced by the first seismic source and the at least one additional seismic source at the at least one seismic receiver;
    optimizing the baseline seismic survey for separation of the sensed energy according to the first seismic source and the at least one additional seismic source;
    performing the fracturing operation by pumping a fracturing fluid into a well bore of the hydrocarbon reservoir;

performing a closing seismic survey with the first seismic source and the at least one seismic receiver at the end of the fracturing operation;

analyzing one or more differences between an image generated by the baseline seismic survey and an image generated by the closing seismic survey; and identifying one or more locations of the fracturing fluid within a subsurface formation in which the hydrocarbon reservoir is located.

15. A method for managing a fracturing operation, comprising:

positioning a first seismic source and at least one seismic receiver near a hydrocarbon reservoir;

performing the fracturing operation by pumping a fracturing fluid into a well bore of the hydrocarbon reservoir;

performing a first seismic survey with the first seismic source and the at least one seismic receiver during the fracturing operation;

performing a second seismic survey with the first seismic source, at least one additional seismic source, and the at least one seismic receiver at the end of the fracturing operation, wherein the first seismic source and the at least one additional seismic source are fired substantially simultaneously;

analyzing one or more differences between an image generated by the first seismic survey and an image generated by the second seismic survey; and identifying one or more locations of the fracturing fluid within a subsurface formation in which the hydrocarbon reservoir is located.

16. A method for managing a fracturing operation, comprising:

positioning a first seismic source and at least one seismic receiver near a hydrocarbon reservoir;

performing the fracturing operation by pumping a fracturing fluid into a well bore of the hydrocarbon reservoir;

performing a first seismic survey with the first seismic source and the at least one seismic receiver during the fracturing operation;

performing a second seismic survey with the first seismic source, at least one additional seismic source, and the at least one seismic receiver at the end of the fracturing operation;

sensing energy produced by the first seismic source and the at least one additional seismic source at the at least one seismic receiver;

optimizing the second seismic survey for separation of the sensed energy according to the first seismic source and the at least one additional seismic source analyzing one or more differences between an image generated by the first seismic survey and an image generated by the second seismic survey; and identifying one or more locations of the fracturing fluid within a subsurface formation in which the hydrocarbon reservoir is located.

* * * * *